(12) United States Patent
Guertin et al.

(10) Patent No.: US 11,627,014 B2
(45) Date of Patent: Apr. 11, 2023

(54) DISTRIBUTED ELECTRIC AIR DATA MODULE SYSTEM

(71) Applicant: Rosemount Aerospace Inc., Burnsville, MN (US)

(72) Inventors: Anthony D. Guertin, Big Lake, MN (US); Charles Huss, Shakopee, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 901 days.

(21) Appl. No.: 16/533,025

(22) Filed: Aug. 6, 2019

(65) Prior Publication Data
US 2021/0044447 A1  Feb. 11, 2021

(51) Int. Cl.
| | |
|---|---|
| G01K 13/00 | (2021.01) |
| H04L 12/40 | (2006.01) |
| B64F 5/60 | (2017.01) |
| G01L 19/00 | (2006.01) |
| G01P 13/02 | (2006.01) |
| H04L 67/12 | (2022.01) |

(52) U.S. Cl.
CPC .......... *H04L 12/40* (2013.01); *B64F 5/60* (2017.01); *G01K 13/00* (2013.01); *G01L 19/0061* (2013.01); *G01P 13/025* (2013.01); *H04L 67/12* (2013.01); *H04L 2012/4028* (2013.01)

(58) Field of Classification Search
CPC .......... H04L 12/40; H04L 67/12; B64F 5/60; G01K 13/00; G01P 13/025
See application file for complete search history.

(56) References Cited

U.S. PATENT DOCUMENTS

| | | | |
|---|---|---|---|
| 6,250,149 B1 * | 6/2001 | Black | G01K 13/02 |
| | | | 73/178 R |
| 6,543,298 B2 | 4/2003 | Cronin et al. | |
| 6,668,640 B1 | 12/2003 | Alwin et al. | |

(Continued)

FOREIGN PATENT DOCUMENTS

| | | |
|---|---|---|
| CN | 105953816 A | 9/2016 |
| EP | 2098927 A1 | 9/2009 |

(Continued)

OTHER PUBLICATIONS

Extended European Search Report dated Jun. 8, 2020, received for corresponding European Application No. 19213918.6, 7 pages.

*Primary Examiner* — Jamel E Williams
(74) *Attorney, Agent, or Firm* — Kinney & Lange, P.A.

(57) ABSTRACT

A distributed air data module system includes several air data systems and a control module communicatively connected to each air data system via a data channel. Each of the air data systems includes a sensor that is configured to sense an air data parameter and to provide a sensor output signal that is indicative of the sensed air data parameter, and a sensor analog-to-digital converter that produces a digital air data parameter signal that is representative of the sensor output signal. Each air data system has an associated air data system address code. The control module is configured to generate a selected air data system address code corresponding to a selected air data systems, receive the digital air data parameter signal associated with the selected air data system via the data channel, and transmit the digital air data parameter signal via an aircraft data bus.

20 Claims, 5 Drawing Sheets

(56) References Cited

U.S. PATENT DOCUMENTS

| | | | |
|---|---|---|---|
| 6,761,057 B2* | 7/2004 | Cronin | G01P 21/025 |
| | | | 702/116 |
| 7,213,454 B2 | 5/2007 | Schauer et al. | |
| 7,363,809 B2* | 4/2008 | Miller | G01P 13/025 |
| | | | 73/170.02 |
| 8,527,233 B2 | 9/2013 | McIntyre | |
| 9,841,304 B2 | 12/2017 | Chong et al. | |
| 2008/0147255 A1* | 6/2008 | Alwin | B64D 43/02 |
| | | | 701/14 |
| 2010/0057220 A1* | 3/2010 | Araki | G05B 19/058 |
| | | | 700/7 |
| 2014/0324389 A1* | 10/2014 | Baldwin | G01D 11/30 |
| | | | 702/187 |
| 2018/0164337 A1* | 6/2018 | Naslund | B64D 43/00 |
| 2019/0146830 A1* | 5/2019 | Gerber | G06N 20/00 |
| | | | 718/101 |
| 2021/0194965 A1* | 6/2021 | Crowne | G05B 19/042 |

FOREIGN PATENT DOCUMENTS

| | | |
|---|---|---|
| EP | 3333577 A1 | 6/2018 |
| WO | 2008077131 A2 | 6/2008 |

* cited by examiner

DISTRIBUTED ELECTRIC AIR DATA MODULE SYSTEM

BACKGROUND

The present disclosure relates to pressure sensors, and more particularly, to a distributed electric air data module system that simplifies the hardware requirement for an airborne system.

Pressure sensors are known in the aviation art and in other industries for providing pressure readings in air data systems that are indicative of numerous environmental and/or aircraft parameters during all stages of flight. These various pressure sensors are processed by air data systems which each containing associated hardware components for measuring and processing various pressure indications. Each of the various air data systems typically provide signals to an avionics system, while also providing electrical isolation of these various systems by incorporating power supplies and signal processing hardware within each of the various air data systems. Typically, multiple air data systems are installed aboard an aircraft for detecting various environmental parameters while also providing redundancy. The cost, weight, and power budget associated with multiple redundant air data systems can be justified for many applications, for example, commercial and military aircraft.

Smaller aircraft, and particularly unmanned aerial vehicles, can have restrictions for cost, weight, and/or power budget that are at odds with the traditional solution of providing multiple redundant air data systems. Accordingly, there is a need for a distributed electric air data module system that reduces the hardware requirements associated with multiple pressure sensors and associated air data systems, thereby offering a corresponding reduction in cost, weight, and/or power requirements.

SUMMARY

A distributed air data module system includes several air data systems and a control module communicatively connected to each air data system via a data channel. Each of the air data systems includes a sensor that is configured to sense an air data parameter and to provide a sensor output signal that is indicative of the sensed air data parameter, and a sensor analog-to-digital converter (ADC) that produces a digital air data parameter signal that is representative of the sensor output signal. Each air data system has an associated air data system address code. The control module is configured to generate a selected air data system address code corresponding to a selected air data systems, receive the digital air data parameter signal associated with the selected air data system via the data channel, and transmit the digital air data parameter signal via an aircraft data bus.

A method of using a distributed air data module system that includes several air data systems and a control module communicatively connected to each air data system via a data channel. Each of the air data systems includes a sensor that is configured to sense an air data parameter and to provide a sensor output signal that is indicative of the sensed air data parameter, and a sensor analog-to-digital converter (ADC) that produces a digital air data parameter signal that is representative of the sensor output signal. Each air data system has an associated air data system address code. The method includes producing a corresponding sensor output signal by each of the sensors, producing a corresponding digital air data parameter signal by each of the sensor ADCs, generating a selected air data system address code corresponding to a selected air data system by the control module, receiving the digital air data parameter signal associated with the selected air data system based on the generated air data sensor address code via the data channel, and transmitting the digital air data parameter signal via an aircraft data bus.

DETAILED DESCRIPTION

Figure 1:
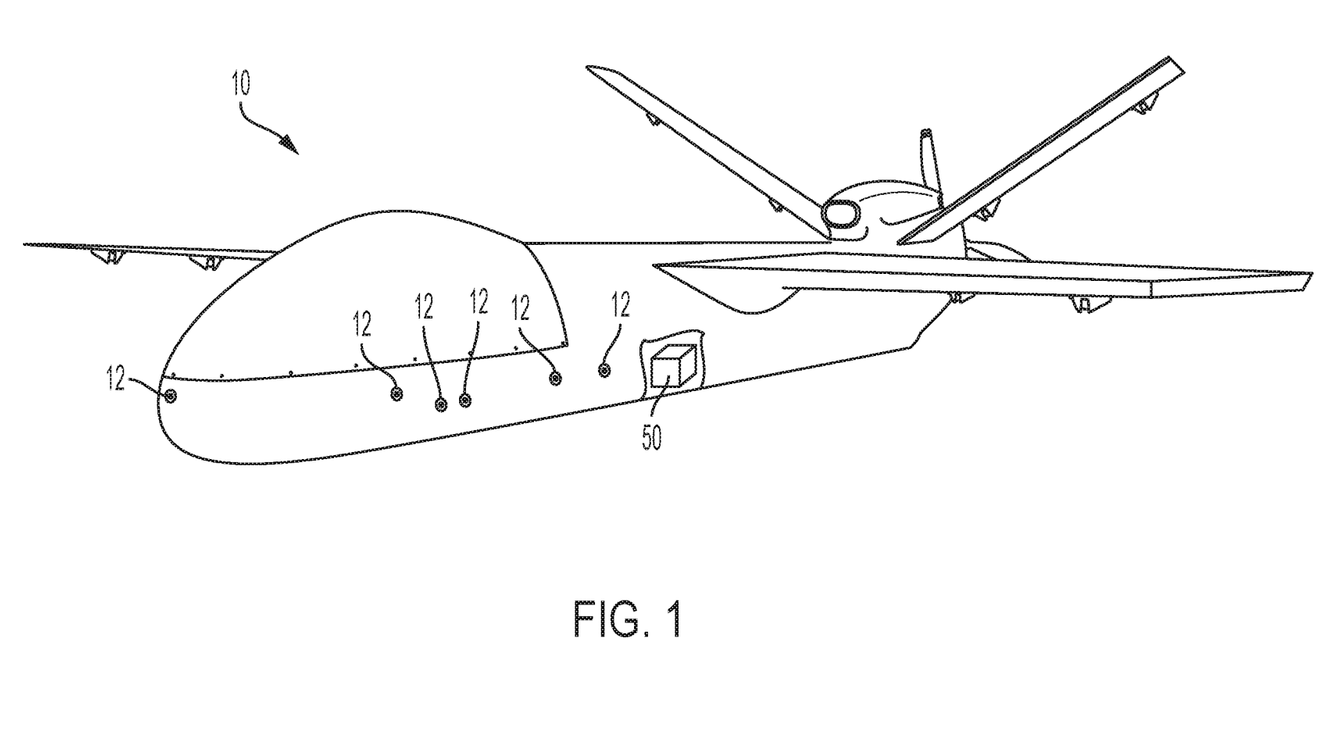
FIG. 1 is a perspective view of an aircraft showing several air data probes.

FIG. 1 is a perspective view of an aircraft showing several air data systems. Shown in FIG. 1 are aircraft 10, air data systems 12, and control module 50. Aircraft 10 is an exemplary unmanned aerial vehicle (i.e., having no onboard pilot or air crew), being smaller in size and weight than a typical commercial or military aircraft. A number of air data systems 12 are distributed on aircraft 10, each producing an electrical signal that is representative of a sensed pressure as will be described in more detail later in FIGS. 2A-2E. Control module 50 provides centralized control of multiple air data systems 12, and will be described in greater detail later, in FIG. 3. In some embodiments, aircraft 10 can be a manned aircraft, with non-limiting examples including private, commercial, and military aircraft. Any number of air data systems 12 is within the scope of the present disclosure, and the various air data systems 12 can be located anywhere on aircraft 10. Moreover, all type and sizes of aircraft 10 are within the scope of the present disclosure. The following figures illustrate four exemplary air data systems 12, which will be labeled as 12a, 12b, 12c, and 12d, described as follows.

Figure 2A:
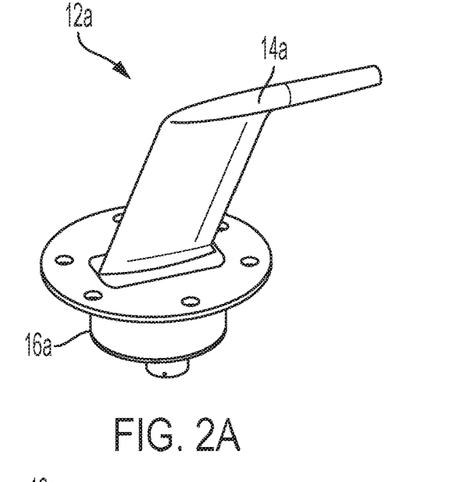
FIG. 2A is a perspective view of a total pressure data system.
Figure 2B:
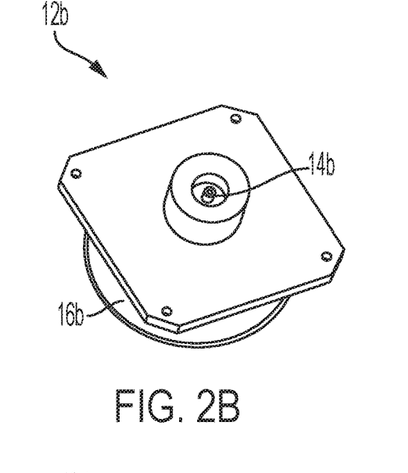
FIG. 2B is a perspective view of a static pressure data system.
Figure 2C:
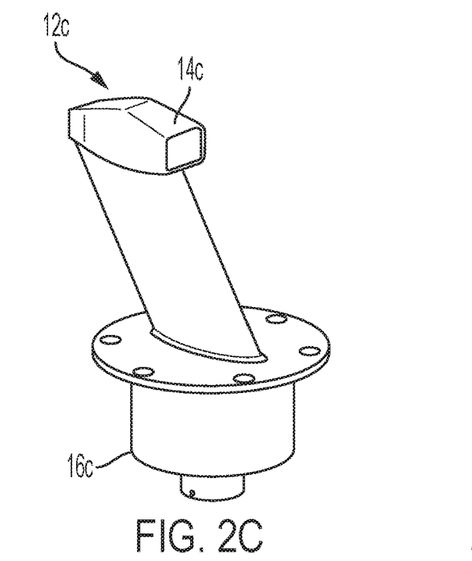
FIG. 2C is a perspective view of a total air temperature data system.
Figure 2D:
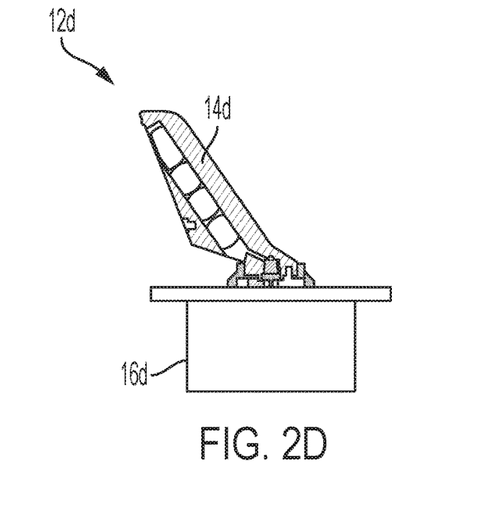
FIG. 2D is a perspective view of an angle of attack data system.

FIG. 2A is a perspective view of total pressure data system 12a, FIG. 2B is a perspective view of a static pressure data system 12b, FIG. 2C is a perspective view of a total air temperature data system 12c, and FIG. 2D is a perspective view of angle of attack data system 12d. Total pressure data system 12a includes total pressure probe 14a, and can be used for measuring a total pressure during flight of aircraft 10. Static pressure data system 12b includes static pressure probe 14b, and can be used for measuring a static pressure during flight of aircraft 10. Total air temperature data system 12c includes total air temperature probe 14c, and can be used for measuring a total air temperature during flight of aircraft 10. Angle of attack data system 12d includes angle of attack probe 14d, and can be used for measuring an angle of attack during flight of aircraft 10.

Figure 2E:
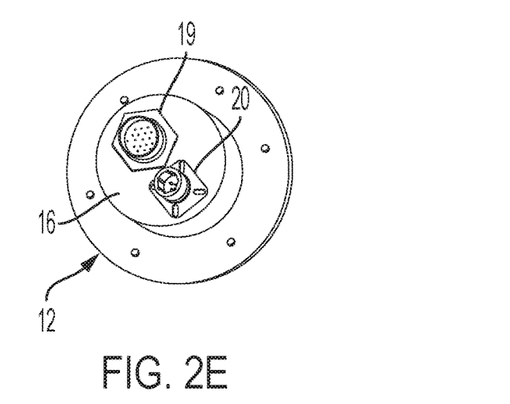
FIG. 2E is a perspective view of the bottom of the total pressure data system shown in FIG. 2A.

FIG. 2E is a perspective view of the bottom of total pressure data system 12a shown in FIG. 2A, while also being representative of the bottoms of static pressure data system 12b, total air temperature data system 12c, and angle of attack data system 12d. Shown in FIG. 2E are air data system 12, air data system instrument package 16, air data system signal connector 19, and air data system power connector 20. In the illustrated embodiment, air data system 12 can be total pressure data system 12a, static pressure data system 12b, total air temperature data system 12c, or angle of attack data system 12d. In other embodiments, air data system 12 can be configured to measure another environmental parameter on aircraft 10. Air data system instrument package 16 includes sensors and associated electronic circuitry (not shown) that are used to measure the particular environmental parameter for which the particular air data system 12 is configured to measure. Non-limiting examples of sensors include micromechanical piezoresistive pressure sensors for measuring pressure, and resistance temperature detectors for measuring temperature. A pressure sensor, for example, can be configured to measure absolute, gage, or differential pressure, depending on the particular environmental parameter being measured. An electrical heater (not shown in FIGS. 2A-2E) can be used to control ice accretion on an associated probe (e.g., total pressure probe 14a, static pressure probe 14b, total air temperature probe 14c, angle of attack probe 14d), because ice accumulation can affect the ability of a particular sensor to accurately measure a particular environmental parameter. Air data system signal connector 19 provides an electrical connection for an associated cable (not shown) to connect air data system instrument package 16 to control system 50, and will be described in greater detail later in FIG. 3. Similarly, air data system power connector 20 provides an electrical connection for an associated cable (not shown) to connect air data system instrument package 16 to control system 50, and will be described in greater detail later in FIG. 3. In the illustrated embodiment, air data system power connector 20 provides electrical power for the heater, while electronics power is provided via air data system signal connector 19. In some embodiments, heater power and/or electronics power can be provided to air data system 12 via air data system signal connector 19 and/or air data system power connector 20. In other embodiments, a single electrical connector can be used on air data system instrument package 16. In yet other embodiments, three or more electrical connectors can be used on air data system instrument package 16.

Referring again to FIGS. 2A-2E, each of the various air data systems 12 on aircraft 10 function as a self-contained instrument that receives electrical power and control signals from control system 50, and transmits electrical signals indicative of a sensed environmental parameter to control system 50. Accordingly, total pressure data system 12a can be referred to as a smart pitot system, static pressure data system 12b can be referred to as a smart static system, total air temperature data system 12c can be referred to as a smart total air temperature (TAT) system, and angle of attack data system 12d can be referred to as a smart angle of attack (AOA) system. Moreover, the collection of air data systems 12 in a particular embodiment, along with controller 50, can be referred to as a distributed electric air data module system, or as a distributed air data module system.

Figure 3:
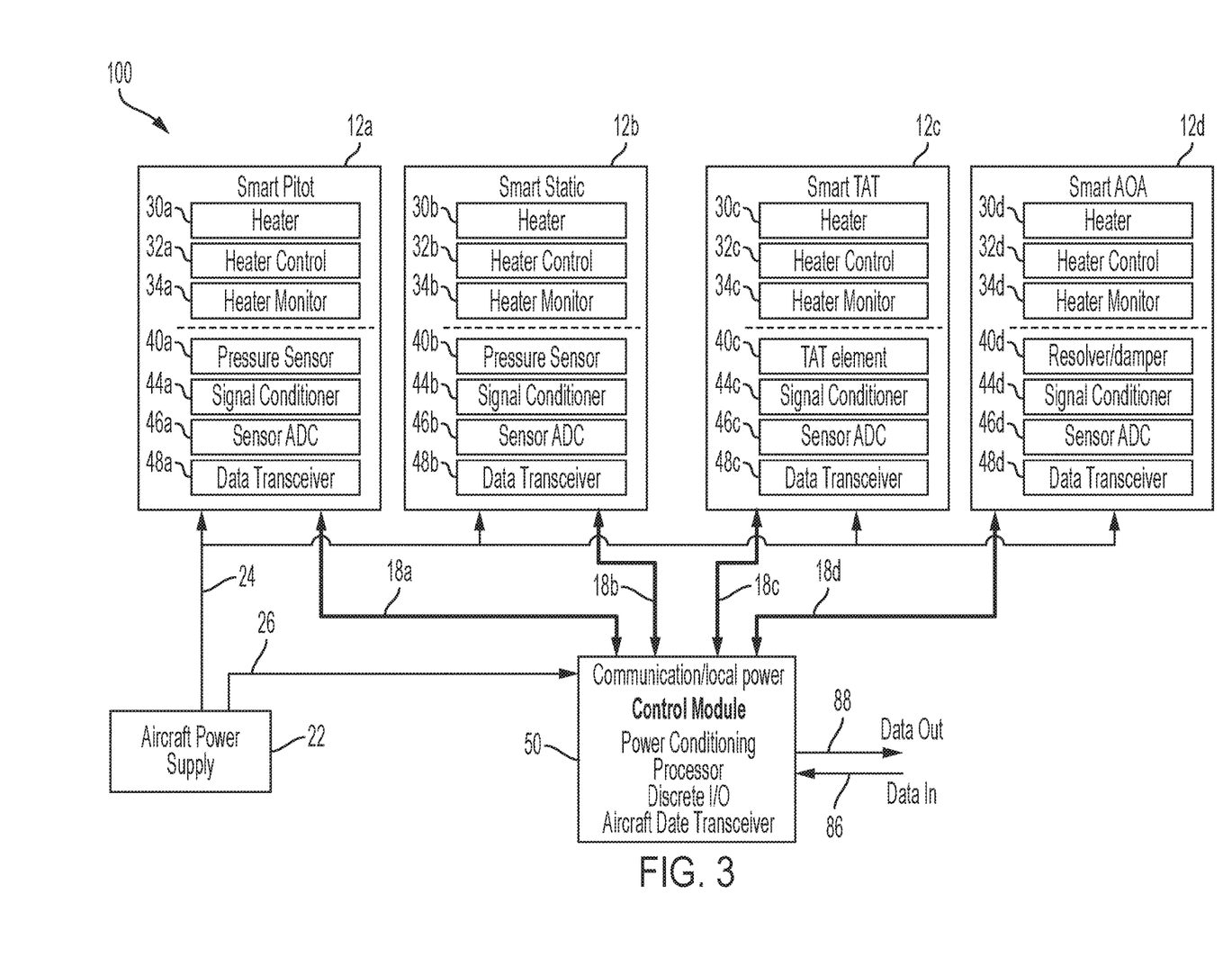
FIG. 3 is a schematic block diagram of a distributed electric air data module system.

FIG. 3 is a schematic block diagram of a distributed air data module system. Shown in FIG. 3 are distributed air data module system 100, total pressure data system 12a, static pressure data system 12b, total air temperature data system 12c, angle of attack data system 12d, total pressure data channel 18a, static pressure data channel 18b, total air temperature data channel 18c, angle of attack data channel 18d, aircraft power supply 22, heater power line 24, equipment power line 26, heaters 30a, 30b, 30c, 30d, heater control circuits 32a, 32b, 32c, 32d, heater monitors 34a, 34b, 34c, 34d, pressure sensors 40a, 40b, total air temperature element 40c, resolver/damper 40d, signal conditioners 44a, 44b, 44c, 44d, sensor analog-to-digital converters (ADCs) 46a, 46b, 46c, 46d, data transceivers 48a, 48b, 48c, 48d, control module 50, data in 86, and data out 88. Total pressure data system 12a, static pressure data system 12b, total air temperature data system 12c, and angle of attack data system 12d (i.e., air data systems 12) were described above in regard to FIGS. 2A-2D, with each having associated data channel 18 (e.g., total pressure data channel 18a, static pressure data channel 18b, total air temperature data channel 18c, angle of attack data channel 18d) that provides electrical connectivity to control system 50. Aircraft power supply 22 provides electrical heater power to each air data system 12 via heater power line 24. Accordingly, in the illustrated embodiment, each data channel 18 is electrically connected to a respective air data system 12 at air data system signal connector 19, and each air data system 12 receives an associated heater power line 24 at air data system power connector 20, as shown in FIG. 2E. Each respective air data system 12a, 12b, 12c, 12d includes heater 30a, 30b, 30c, 30d for controlling ice accretion, each having an associated heater control circuit 32a, 32b, 32c, 32d and heater monitor 34a, 34b, 34c, 34d. Additionally, each air data system 12a, 12b, 12c, 12d includes an associated sensor, described as follows. Total pressure data system 12a (i.e., smart pitot system) and static pressure data system 12b (i.e., smart static system) each include pressure sensor 40a, 40b, respectively. Total air temperature (TAT) data system 12c (i.e., smart TAT system) includes TAT element 40c. Angle of attack (AOA) data system 12d (i.e., smart AOA system) includes resolver/damper 40d.

Referring again to FIG. 3, each air data system 12a, 12b, 12c, 12d includes signal conditioner 44a, 44b, 44c, 44d, which conditions the sensor output signal (not shown in FIG. 3) provided by the associated sensor 40 (i.e., pressure sensors 40a, 40b, total air temperature element 40c, and resolver/damper 40d, respectively). In the illustrated embodiment, signal conditioners 44a, 44b, 44c, 44d perform sensor signal conditioning that includes amplification to increase signal strength and filtering to remove noise and other undesirable signal components. Sensor ADCs 46a, 46b, 46c, 46d provide a digital representation of the environmental parameter that is measured by the associated sensor 40. In the illustrated embodiment, sensor ADCs 46a, 46b, 46c, 46d provide a digital signal that is 12 bits. In some embodiments, one or more sensor ADCs 46a, 46b, 46c, 46d can provide a digital signal that is more than 12 bits, with 16 and 20 bits being exemplary embodiments. In other embodiments, one or more sensor ADCs 46a, 46b, 46c, 46d can provide a digital signal that is less than 12 bits, with 8 bits being an exemplary embodiment. The output of each sensor ADC 46a, 46b, 46c, 46d is transmitted from the respective air data system 12a, 12b, 12c, 12d via data transceiver 48a, 48b, 48c, 48d and respective data channel 18a, 18b, 18c, 18d. Control module 50 provides a centralized control function for air data systems 12a, 12b, 12c, 12d, and will be described in more detail later in FIGS. 4-5. Other functions performed by control module 50 include providing power conditioning, electrical isolation from other onboard systems, and electronics power supply to the various air data systems 12, providing processing and storage of data, and providing a buffered data input/output interface (not shown in FIG. 3) to other systems (e.g., avionics system) onboard aircraft 10. Data in 86 and data out 88 provide data communication lines for data input to control system 50, and for data output from control system 50, respectively. Accordingly, data in 86 and data out 88 provide for data communications to and from distributed air data module system 100, respectively. Data in 86 and/or data out 88 can also be referred to as data channels, or as data busses. Data communications to and from control system 50 (i.e., distributed air data module system 100) will be described in greater detail later, in FIG. 5.

In the exemplary embodiment illustrated in FIG. 3, four air data systems 12a, 12b, 12c, 12d are shown for simplicity (i.e., one each of each of total pressure data system 12a, static pressure data system 12b, total air temperature data system 12c, and angle of attack data system 12d, respectively). In some embodiments, two or more of each particular air data system 12a, 12b, 12c, 12d can be used. In these embodiments, multiple air data systems 12a, 12b, 12c, 12d can be used for redundancy a particular embodiment. In other embodiments, other types of air data systems 12 (i.e., other than the four described herein) can be used. In yet other embodiments, one or more of the illustrated air data systems 12a, 12b, 12c, 12d can be omitted. Regardless of the number of air data systems 12 used in a particular embodiment, all air data systems 12 that are included in a particular distributed air data module system 100 communicate via an associated data channel 18 with control system 50. Accordingly, any particular configuration of air data systems 12 is within the scope of the present disclosure.

Figure 4:
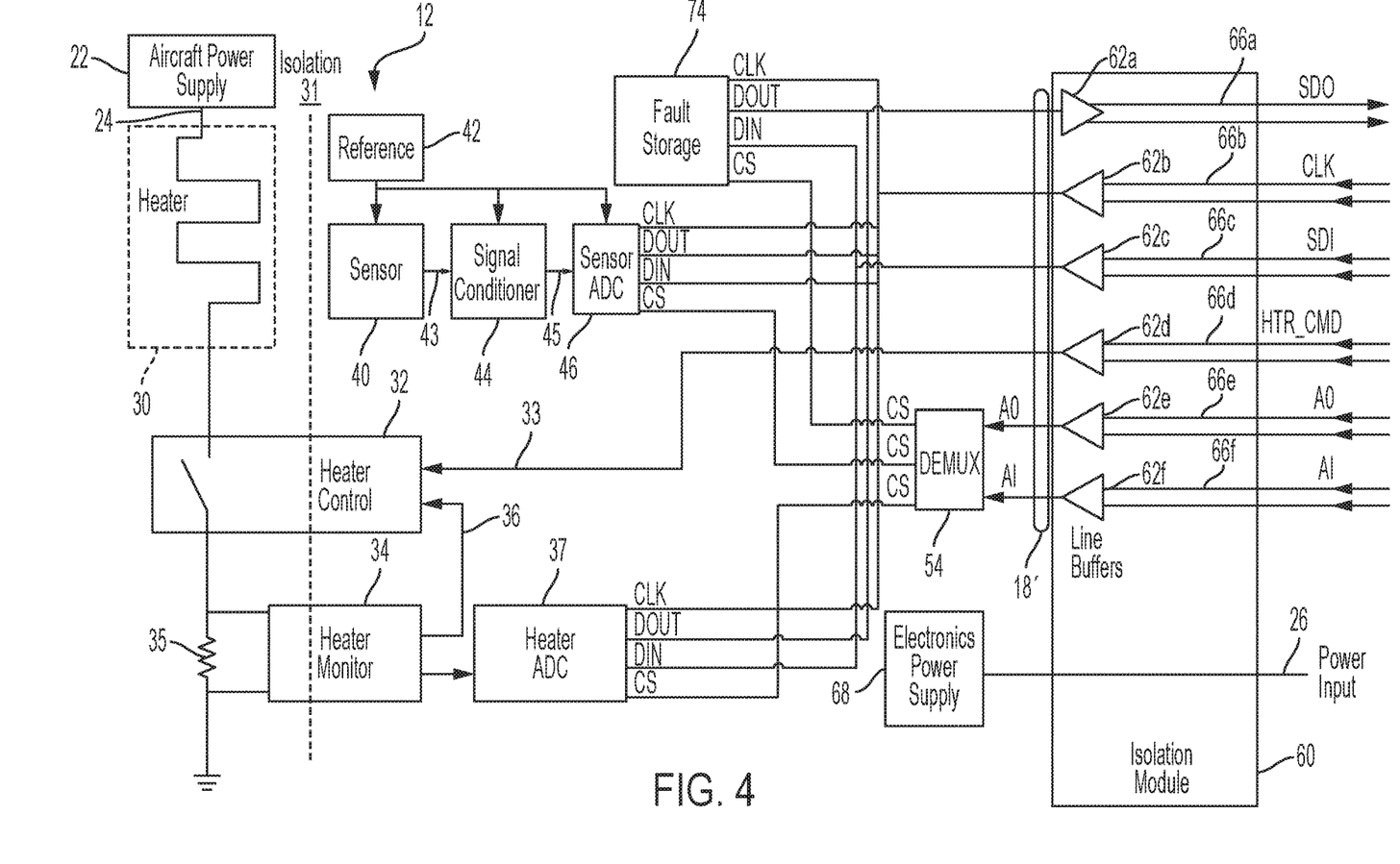
FIG. 4 is a schematic block diagram of an air data system interface circuit.

FIG. 4 is a schematic block diagram of an air data system interface circuit. Shown in FIG. 4 are isolated data channel 18', aircraft power supply 22, heater power line 24, equipment power lines 26, 26', heater 30, heater control circuit 32, heater command signal 33, heater monitor 34, heater current sensor 35, heater control feedback 36, heater analog to digital converter (ADC) 37, sensor 40, reference 42, sensor output signal 43, signal conditioner 44, signal conditioner output signal 45, sensor ADC 46, de-multiplexer (DEMUX) 54, isolation module 60, line buffers 62a, 62b, 62c, 62d, 62e, 62f, serial data out 66a, clock signal 66b, serial data in 66c, heater command 66d, address lines 66e, 66f, electronics power supply 68, and fault storage 74. Isolated data channel 18' contains a number of individual data lines (e.g., serial data out 66a, clock signal 66b, serial data in 66c, heater command 66d, address lines 66e, 660 that have been electrically isolated from control module 50. However, isolated data channel 18' conveys the same signals as provided on data channel 18 (i.e., 18a, 18b, 18c, 18d) as described above in regard to FIG. 3. The descriptions of aircraft power supply 22, heater power line 24, and equipment power line 26, are substantially as were provided above in regard to FIG. 3. Heater 30 is an electrical heater that receives electrical power from heater power line 24, thereby producing heat to control ice accretion of the associated probe (e.g., total pressure probe 14a, static pressure probe 14b, total air temperature probe 14c, angle of attack probe 14d) of a particular air data system 12. Heater control circuit 32 receives heater command signal 33, thereby controlling the flow of electrical current through heater 30 by alternately making and breaking a path for current flow. Heater monitor 34 senses the flow of electrical current through heater 30 by detecting an electrical signal that is produced by heater current sensor 35. In the illustrated embodiment, heater current sensor 35 is a resistor that develops a voltage potential when heater current flows in series through heater current sensor 35. Heater control feedback 36 directs heater control circuit 32 in maintaining the desired temperature of heater 30. Heater ADC 37 produces a digital signal that is representative of the flow of electrical current through heater 30. Heater ADC 37 can be referred to as a chip, and transmits the so-produced digital signal when invoked by a chip select (CS) signal, as will be described.

Sensor 40 represents a particular sensor (e.g., pressure sensor 40a, 40b, total air temperature element 40c, resolver/damper 40d) in the associated air data system 12 (e.g., total pressure data system 12a, static pressure data system 12b, total air temperature data system 12c, angle of attack data system 12d). It is to be appreciated that FIG. 4 illustrates air data system interface circuit 110 with regard to a particular air data system 12, with the embodiment that was illustrated in FIG. 3 including four air data systems 12. Reference 42 provides reference values that are used by sensor 40, and can also be referred to as a sensor reference. In the illustrated embodiment, reference 42 provides calibration and linearity factors that are applied to sensor 40 to improve the accuracy in measuring a particular environmental parameter. Sensor 40 produces sensor output signal 43 which is received by signal conditioner 44 and provided as signal conditioner output signal 45. The descriptions of signal ADC 46 is as provided above in regard to FIG. 3. Signal ADC 46 transmits the digitized representation of sensor output signal 43 when invoked by a chip select (CS) line, as will be described. Signal ADC can also be referred to as a chip.

DEMUX 54 receives a chip select (CS) address via address lines 66e, 66f, thereby activating a chip select line that enables a particular chip (e.g., heater ADC 37, data transceiver 48, fault storage 74). In the illustrated embodiment there are two address lines 66e, 66f, each of which carries a binary (i.e., two-state) signal. Accordingly, the number (N) of total available chip select lines can be calculated as $N=(2)^2$. As shown in FIG. 4, the two address lines 66e, 66f accommodate three selectable "chips" (i.e., heater ADC 37, sensor ADC 46, and fault storage 74). In other embodiments, there can be three or more address lines 66e, 66f, . . . 66x, thereby allowing for a greater number of chip select lines. In an exemplary embodiment, four address lines (i.e., 66e, 66f, 66g, 66h) can accommodate sixteen chip select lines (i.e., $N=(2)^4$.)

Referring again to FIG. 4, isolation module 60 provides electrical isolation in air data system interface circuit 110 by providing electromagnetic interference (EMI) suppression, surge and impulse suppression, noise filtering, and the like. Isolation module 60 also includes line buffers 62a, 62b, 62c, 62d, 62e, 62f, with a line buffer 62 being associated with each of the individual data lines 66 (e.g., serial data out 66a, clock signal 66b, serial data in 66c, heater command 66d, address lines 66e, 66f). In the illustrated embodiment, line buffers 62a-62f are differential input buffers having two input lines and a single output line, thereby providing improved noise immunity from the respective air data system 12. In an exemplary embodiment, line buffers 62a-62f each include an optical isolator (i.e., opto-isolator) that transmits a data signal while electrically isolating the respective data line 66a-66f across isolation module 60. In some embodiments, one or more line buffers 62a-62f can be a different type of line buffer, with non-limiting examples including single-input line buffers and/or non-optical line buffers. Referring again to FIG. 4, isolation module 60 can also include electrical surge and isolation clamping circuits, EMI and/or radio frequency (RF) filters, low-pass and/or band-pass filters, and other electrical isolation components. In other embodiments, isolation module 60 (i.e., including line buffers 62) can utilize other means of providing electrical isolation. Accordingly, isolation module 60 provides protection against electrical and electromagnetic interference that can occur from sources onboard aircraft 10 and/or external to aircraft 10. Non-limiting examples of onboard interference sources include motors, actuators, relays, and radio transceivers. Non-limiting examples of external interference include static charges, lightning strikes, induced voltages from radio and/or radar transmissions, and electromagnetic pulses (EMP).

Referring again to FIG. 4, fault storage 74 stores (i.e., holds) data within distributed air data module system 100, with non-limiting examples including fault values and locations, sensor coefficients, and the like. In the illustrated embodiment, fault storage 74 is non-volatile storage, with a non-limiting example being erasable programmable read-only memory (EPROM). Fault storage 74 can also be referred to as a chip, and can receive data input and/or provide data output as enabled by a by a chip select line from DEMUX 54, in which address lines 66e, 66f provide an address corresponding to fault storage 74. Fault storage 74 can also be referred to as computer-readable memory, or as a fault storage module. Data transfer within a particular air data system 12 is performed serially. In an exemplary embodiment, a serial peripheral interface (SPI) over an RS-422 physical layer can be used. In other embodiments, other data exchange protocols can be used. Individual data lines 66 provide bi-directional data communication within distributed air data module system 100, thereby providing data communication between control module 50 and any particular air data system 12. Serial data out 66a transmits data from the selected chip (e.g., heater ADC 37, data transceiver 48, fault storage 74) depending on the particular chip select line that is enabled. Clock signal 66b provides a system clock signal to the various chips (e.g., heater ADC 37, data transceiver 48, fault storage 74). Serial data in 66c provides data to a selected chip (e.g., heater ADC 37, data transceiver 48, fault storage 74) depending on the particular chip select line that is enabled. Heater command 66d provides heater command signal 33, as described above in regard to FIG. 3.

Figure 5:
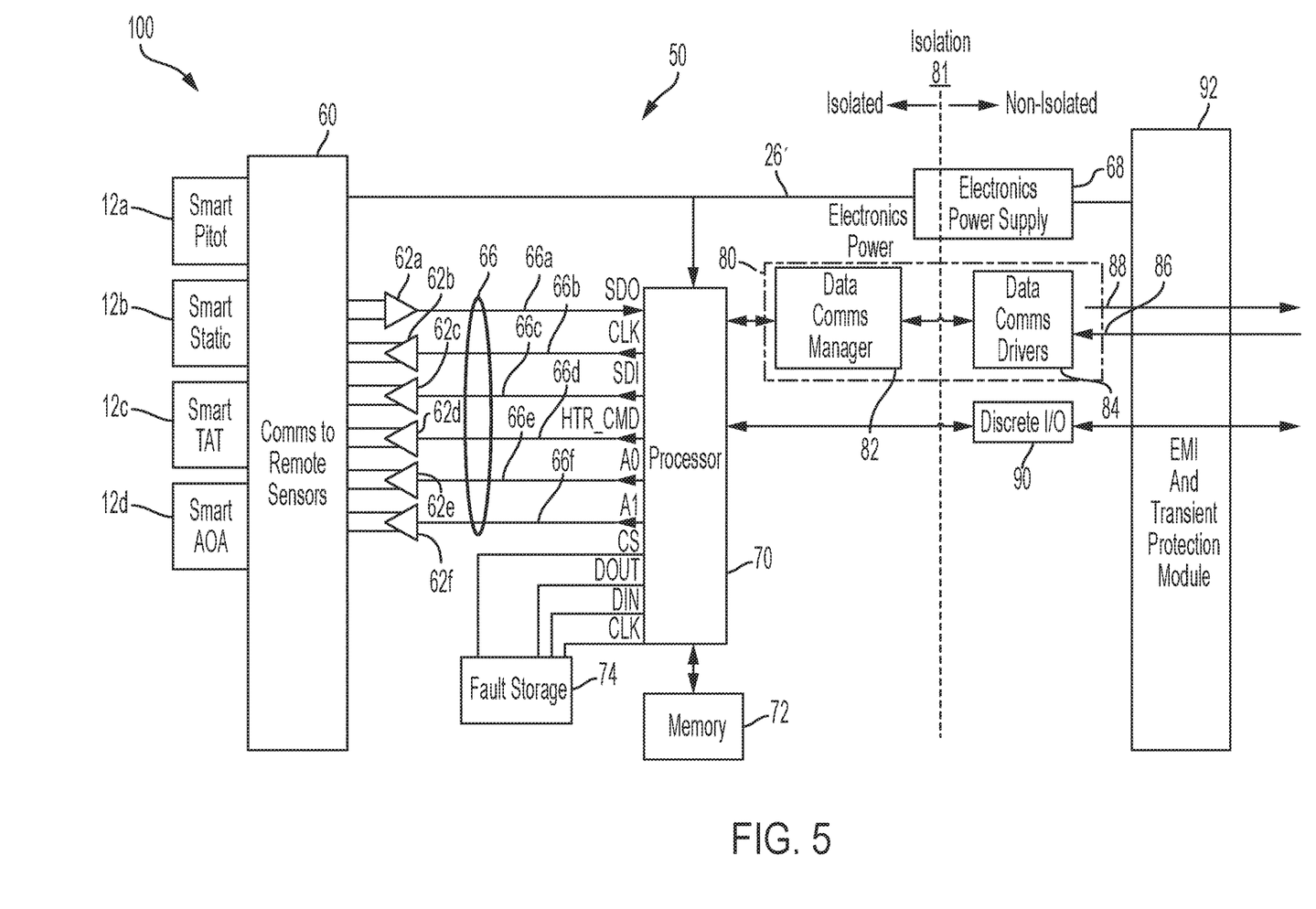
FIG. 5 is a schematic block diagram showing the air data probe interface circuit shown in FIG. 4 with multiple air data systems.

FIG. 5 is a schematic block diagram showing distributed air data module system 100. Shown in FIG. 5 are total pressure data system 12a (i.e., smart pitot system), static pressure data system 12b (i.e., smart static system), total air temperature data system 12c (i.e., smart TAT system), angle of attack data system 12d (i.e., smart AOA system), isolated equipment power line 26', control system 50, communications to remote sensors module 60, serial data out 66a, clock signal 66b, serial data in 66c, heater command 66d, address lines 66e, 66f, processor 70, memory 72, fault storage 74, data interface module 80, isolation boundary 81, data management module 82, data communications drivers 84, Data in 86, Data out 88, discrete input/output (I/O) module 90, electromagnetic interference (EMI) and transient protection module 92, and distributed air data module system 100. As used in the present disclosure, "communications" can be abbreviated as "comms". The descriptions of total pressure data system 12a, static pressure data system 12b, total air temperature data system 12c, angle of attack data system 12d, isolated equipment power line 26', control system 50, serial data out 66a, clock signal 66b, serial data in 66c, heater command 66d, address lines 66e, 66f, electronics power supply 68, and fault storage 74 are as provided above in regard to FIGS. 3-4. Communications to remote sensors module 60 provides communications from control system 50 to total pressure data system 12a, static pressure data system 12b, total air temperature data system 12c, and angle of attack data system 12d. Collectively, serial data out 66a, clock signal 66b, serial data in 66c, heater command 66d, and address lines 66e, 66f can be referred to as data lines 66. Processor 70 communicates data via data lines 66 to various air data systems 12 (e.g., total pressure data system 12a, static pressure data system 12b, total air temperature data system 12c, angle of attack data system 12d) through isolation module 60 as described above in regard to FIG. 4.

Processor provides clock signal 66b and signals for address lines 66e, 66f, thereby directing the chip selection of various components throughout distributed air data module system 100, and in turn driving data flow throughout distributed air data module system 100. Processor 70 is configured to implement functionality and/or process instructions for execution within controller 50 (not labeled in FIG. 5). Examples of processor 70 can include any one or more of a microprocessor, a controller, a digital signal processor (DSP), an application specific integrated circuit (ASIC), a field-programmable gate array (FPGA), or other equivalent discrete or integrated logic circuitry. Processor 70 can receive process instructions that are stored in memory 72. Examples of memory 72 can include random access memories (RAM), dynamic random access memories (DRAM), static random access memories (SRAM), and other forms of digital storage media. Accordingly, memory 72 can be referred to as computer-readable memory. Processor 70 provides bi-directional data communication via data interface module 80. Data interface module 80 provides two-way data communications between distributed air data module system 100 and other systems. Data interface module 80 includes data management module 82 and data communications drivers 84 for communicating with other systems (i.e., avionics) onboard aircraft 10. Data communications drivers 84 receive input data via data in 86 and transmit output data via data out 88. Data communications drivers 84 include optical isolators (i.e., opto-isolators) that transmit data signals while electrically isolating individual data lines, thereby helping form isolation boundary 81 between data management module 82 and data communications drivers 84. Isolation boundary also provides electrical isolation within electronics power supply 68, as described above in regard to FIG. 4. In an exemplary embodiment, distributed air data module system 100 and associated aircraft 10 can use the ARINC-429 technical standard. In other embodiments, any other data communication protocol (i.e., technical standard) can be used by distributed air data module system 100 and/or aircraft 10, with non-limiting examples including RS-422, RS-485, MIL-STD-1553, controller area network (CAN). In yet other embodiments, other data communications protocols can be used, including a proprietary and/or or airframe-unique data communications protocol.

Referring again to FIG. 5, data communication to and from processor 70 also occurs via discrete input/output (I/O) module 90. In some embodiments, data transmitted via discrete I/O module 90 can be similar to data transmitted via data interface module 80. In other embodiments, other data can be provided via discrete I/O module 90, with non-limiting examples including environmental liquid water content (LWC) from ice-detection systems, heater command signals, and heater location signals. EMI and transient protection module 92 provides electrical isolation and has a description that is substantially similar to that provided for isolation module 60 above in regard to FIG. 4. In having EMI and transient protection module 92, as shown in FIG. 5. By electrically isolating components that are vulnerable to EMI from various interfaces on aircraft 10, the cumulative number of individual EMI, surge, and transient isolation devices is reduced, thereby reducing the overall size, weight, and cost associated with EMI, surge, and transient isolation within distributed air data module system 100.

DISCUSSION OF POSSIBLE EMBODIMENTS

The following are non-exclusive descriptions of possible embodiments of the present invention.

A distributed air data module system, comprising: a plurality of air data systems, each comprising: a sensor, configured to sense an air data parameter and to provide a sensor output signal that is indicative of the sensed air data parameter; and a sensor analog-to-digital converter (ADC), configured to produce a digital air data parameter signal that is representative of the sensor output signal; wherein each of the plurality of air data systems has an associated air data system address code; and a control module, communicatively connected to each of the plurality of air data systems via a data channel, the control module configured to: generate a selected air data system address code corresponding to a selected one of the plurality of air data systems; receive, via the data channel, the digital air data parameter signal associated with the selected one of the plurality of air data systems; and transmit, via an aircraft data bus, the digital air data parameter signal.

The distributed air data module system of the preceding paragraph can optionally include, additionally and/or alternatively, any one or more of the following features, configurations and/or additional components:

A further embodiment of the foregoing distributed air data module system, wherein: the sensor is a total pressure sensor that is configured to sense a total pressure; and the air data parameter signal is representative of the total pressure.

A further embodiment of the foregoing distributed air data module system, wherein: the sensor is a static pressure sensor that is configured to sense a static pressure; and the air data parameter signal is representative of the static pressure.

A further embodiment of the foregoing distributed air data module system, wherein: the sensor is a total air temperature sensor that is configured to sense a total air temperature; and the air data parameter signal is representative of the total air temperature.

A further embodiment of the foregoing distributed air data module system, wherein: the sensor is an angle of attack sensor that is configured to sense an angle of attack; and the air data parameter signal is representative of the angle of attack.

A further embodiment of the foregoing distributed air data module system, wherein each of the air data systems further comprises a signal conditioner that is configured to amplify and/or filter the sensor output signal.

A further embodiment of the foregoing distributed air data module system, wherein each digital air data parameter signal comprises at least 12 bits.

A further embodiment of the foregoing distributed air data module system, wherein the air data sensor address code comprises two or more bits.

A further embodiment of the foregoing distributed air data module system, wherein each of the air data systems further comprises: a heater, configured to: receive heater electrical power; and convert the heater electrical power into heat, thereby melting ice; a heater control circuit, configured to control the heater electrical power in response to a heater command signal from the control module; a heater monitor circuit, configured to monitor an electrical current flowing through the heater; and a heater analog-to-digital converter (ADC), configured to: produce a digital heater current signal that is representative of the electrical current flowing through the heater; and transmit the digital heater current signal via a serial data output line to the control module when commanded by a chip select signal.

A further embodiment of the foregoing distributed air data module system, wherein each of the air data systems further comprises a fault storage device, configured to: store system fault data representative of a fault in the particular air data system; and transmit the system fault data via a serial data output line to the control module when commanded by a chip select signal.

A further embodiment of the foregoing distributed air data module system, wherein each of the sensor ADCs is further configured to transmit the digital air data parameter signal via a serial data output line when commanded by a chip select signal.

A further embodiment of the foregoing distributed air data module system, wherein each of the air data systems further comprises a de-multiplexer, configured to: receive a chip select address via two or more address lines; and based on the received chip select address, generate a chip enable signal corresponding to a selected chip; wherein the selected chip is selected from the group consisting of a heater ADC, the sensor ADC, and a fault storage.

A further embodiment of the foregoing distributed air data module system, further comprising an electromagnetic interference (EMI) protection interface configured to provide EMI isolation between the plurality of air data systems and the control module.

A further embodiment of the foregoing distributed air data module system, further comprising a plurality of data channels, each corresponding to an associated one of the plurality of air data systems, wherein: each of the plurality of data channels comprises: a serial data output line, configured to transmit serial data from the associated air data system; a clock signal line, configured to provide a clock signal to the associated air data system; a serial data input line, configured to transmit serial data to the associated air data system; a heater command line, configured to transmit a heater command signal to the associated air data system; and two or more address lines, configured to together transmit a chip select address; and each of the plurality of data channels communicatively connects the associated air data system to the control module.

A further embodiment of the foregoing distributed air data module system, further comprising an isolation module configured to provide electrical isolation between the control module and one or more of the plurality of air data systems, the isolation module comprising one or more optical isolators.

A further embodiment of the foregoing distributed air data module system, wherein the aircraft data bus comprises an ARINC-429 technical standard.

A further embodiment of the foregoing distributed air data module system, further comprising a discrete input/output (I/O) module, configured to transfer data from the control module to an external system.

A method of using a distributed air data module system, the distributed air data module system comprising a plurality of air data systems and a control module communicatively connected to each of the plurality of air data systems via a data channel, each of the plurality of air data systems having an associated air data system address code, each of the plurality of air data systems comprising a sensor and a sensor analog-to-digital converter (ADC), each sensor configured to sense an air data parameter and to provide a sensor output signal that is indicative of the sensed air data parameter, and the sensor ADC configured to produce a digital air data parameter signal that is representative of the sensor output signal, the method comprising: producing, by each of the plurality of sensors, a corresponding sensor output signal; producing, by each of the sensor ADCs, a corresponding digital air data parameter signal; generating, by the control module, a selected air data system address code corresponding to a selected air data system; receiving, via the data channel, the digital air data parameter signal associated with the selected air data system based on the generated air data sensor address code; and transmitting, via an aircraft data bus, the digital air data parameter signal.

The method of the preceding paragraph can optionally include, additionally and/or alternatively, any one or more of the following features, configurations and/or additional components:

A further embodiment of the foregoing method, wherein each of the sensor ADCs is further configured to transmit the digital air data parameter signal when commanded by a chip select signal.

A further embodiment of the foregoing method, wherein each of the air data systems further comprises de-multiplexer, configured to: receive a chip select address via two or more address lines; and based on the received chip select address, generate a chip enable signal corresponding to a selected chip; wherein the selected chip is selected from the group consisting of heater ADC, sensor ADC, and fault storage.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A distributed air data module system, comprising:
 a plurality of air data systems, each comprising:
  a sensor, configured to sense an air data parameter and to provide a sensor output signal that is indicative of the sensed air data parameter;
  a sensor analog-to-digital converter (ADC), configured to produce a digital air data parameter signal that is representative of the sensor output signal; and
  a fault storage device, configured to store system fault data representative of a fault in the particular air data system;
  wherein each of the plurality of air data systems has an associated air data system address code; and
 a control module, communicatively connected to each of the plurality of air data systems via a data channel, the control module configured to:
  generate a selected air data system address code corresponding to a selected one of the plurality of air data systems;
  receive, via the data channel, the digital air data parameter signal associated with the selected one of the plurality of air data systems; and
  transmit, via an aircraft data bus, the digital air data parameter signal.

2. The distributed air data module system of claim 1, wherein:
 the sensor is a total pressure sensor that is configured to sense a total pressure; and
 the air data parameter signal is representative of the total pressure.

3. The distributed air data module system of claim 1, wherein:
 the sensor is a static pressure sensor that is configured to sense a static pressure; and
 the air data parameter signal is representative of the static pressure.

4. The distributed air data module system of claim 1, wherein:
 the sensor is a total air temperature sensor that is configured to sense a total air temperature; and
 the air data parameter signal is representative of the total air temperature.

5. The distributed air data module system of claim 1, wherein:
 the sensor is an angle of attack sensor that is configured to sense an angle of attack; and
 the air data parameter signal is representative of the angle of attack.

6. The distributed air data module system of claim 1, wherein each of the air data systems further comprises a signal conditioner that is configured to amplify and/or filter the sensor output signal.

7. The distributed air data module system of claim 1, wherein each digital air data parameter signal comprises at least 12 bits.

8. The distributed air data module system of claim 1, wherein the air data sensor address code comprises two or more bits.

9. The distributed air data module system of claim 1, wherein each of the air data systems further comprises:
 a heater, configured to:
  receive heater electrical power; and
  convert the heater electrical power into heat, thereby melting ice;
 a heater control circuit, configured to control the heater electrical power in response to a heater command signal from the control module;
 a heater monitor circuit, configured to monitor an electrical current flowing through the heater; and
 a heater analog-to-digital converter (ADC), configured to:
  produce a digital heater current signal that is representative of the electrical current flowing through the heater; and
  transmit the digital heater current signal via a serial data output line to the control module when commanded by a chip select signal.

10. The distributed air data module system of claim 1, wherein the fault storage device of each of the air data systems is configured to:
 transmit the system fault data via a serial data output line to the control module when commanded by a chip select signal.

11. The distributed air data module system of claim 1, wherein each of the sensor ADCs is further configured to transmit the digital air data parameter signal via a serial data output line when commanded by a chip select signal.

12. The distributed air data module system of claim 1, wherein each of the air data systems further comprises a de-multiplexer, configured to:
 receive a chip select address via two or more address lines; and based on the received chip select address, generate a chip enable signal corresponding to a selected chip;
wherein the selected chip is selected from the group consisting of a heater ADC, the sensor ADC, and a fault storage.

13. The distributed air data module system of claim 1, further comprising an electromagnetic interference (EMI) protection interface configured to provide EMI isolation between the plurality of air data systems and the control module.

14. The distributed air data module system of claim 1, further comprising a plurality of data channels, each corresponding to an associated one of the plurality of air data systems, wherein:
each of the plurality of data channels comprises:
a serial data output line, configured to transmit serial data from the associated air data system;
a clock signal line, configured to provide a clock signal to the associated air data system;
a serial data input line, configured to transmit serial data to the associated air data system;
a heater command line, configured to transmit a heater command signal to the associated air data system; and
two or more address lines, configured to together transmit a chip select address; and
each of the plurality of data channels communicatively connects the associated air data system to the control module.

15. The distributed air data module system of claim 14, further comprising an isolation module configured to provide electrical isolation between the control module and one or more of the plurality of air data systems, the isolation module comprising one or more optical isolators.

16. The distributed air data module system of claim 1, wherein the aircraft data bus comprises an ARINC-429 technical standard.

17. The distributed air data module system of claim 1, further comprising a discrete input/output (I/O) module, configured to transfer data from the control module to an external system.

18. A method of using a distributed air data module system, the distributed air data module system comprising a plurality of air data systems and a control module communicatively connected to each of the plurality of air data systems via a data channel, each of the plurality of air data systems having an associated air data system address code, each of the plurality of air data systems comprising a sensor, a sensor analog-to-digital converter (ADC), and a fault storage device, each sensor configured to sense an air data parameter and to provide a sensor output signal that is indicative of the sensed air data parameter, the sensor ADC configured to produce a digital air data parameter signal that is representative of the sensor output signal, and the fault storage device configured to store system fault data representative of a fault in the particular air data system, the method comprising:
producing, by each of the plurality of sensors, a corresponding sensor output signal;
producing, by each of the sensor ADCs, a corresponding digital air data parameter signal;
generating, by the control module, a selected air data system address code corresponding to a selected air data system;
receiving, via the data channel, the digital air data parameter signal associated with the selected air data system based on the generated air data sensor address code; and
transmitting, via an aircraft data bus, the digital air data parameter signal.

19. The method of claim 18, wherein each of the sensor ADCs is further configured to transmit the digital air data parameter signal when commanded by a chip select signal.

20. The method of claim 18, wherein each of the air data systems further comprises a de-multiplexer, configured to:
receive a chip select address via two or more address lines; and
based on the received chip select address, generate a chip enable signal corresponding to a selected chip;
wherein the selected chip is selected from the group consisting of heater ADC, sensor ADC, and fault storage.

* * * * *